United States Patent [19]

Gross et al.

[11] 3,710,117

[45] Jan. 9, 1973

[54] VITRO TEST SYSTEM FOR ASSESSING THYROID FUNCTION

[75] Inventors: Jack Gross, Amirav Gordon, both of Jerusalem, Israel

[73] Assignee: Yissum Research Development Company of the Hebrew University of Jerusalem

[22] Filed: April 27, 1970

[21] Appl. No.: 32,185

[52] U.S. Cl............250/106 T, 250/83 SA, 23/230 B
[51] Int. Cl................................................G21h 5/00
[58] Field of Search.250/41.5 S, 83 SA, 106 T, 83 R; 23/230 B; 424/1

[56] References Cited

UNITED STATES PATENTS

| | | | |
|---|---|---|---|
| 3,451,777 | 6/1969 | Di Giulio | 250/83 SA X |
| 3,507,618 | 4/1970 | Murty et al. | 23/230 B |
| 3,206,602 | 9/1965 | Eberle | 250/83 X |
| 3,376,114 | 4/1968 | Eberle | 250/83 X |

*Primary Examiner*—Walter Stolwein
*Assistant Examiner*—Davis L. Willis

*Attorney*—Joseph C. Schwalbach, Michael A. Kondzella, Louis E. Davidson and Harry T. Stephenson

[57] ABSTRACT

Improved in vitro test method and apparatus for assessing thyroid function comprising mixing a microquantity of blood serum with a predetermined amount of a radioactive isotope tagged thyroid hormone solution in the upper portion of a tubular body having a fixed geometry, said body containing a column of predetermined quantity of cross linked dextran gel as a secondary binding site in an aqueous fluid held between porous discs in the lower portion of the body and having valve means at the lower end thereof, allowing said mixture to enter said column, determining the total added thyroid hormone by a radioactivity measurement, washing or eluting said column with a suitable fluid, determining the amount of hormone retained in said column by a radioactivity measurement and making a calculation based on the ratio of the amount of retained hormone to the total amount of added hormone for the particular thyroid hormone being assessed.

8 Claims, 1 Drawing Figure

PATENTED JAN 9 1973
3,710,117
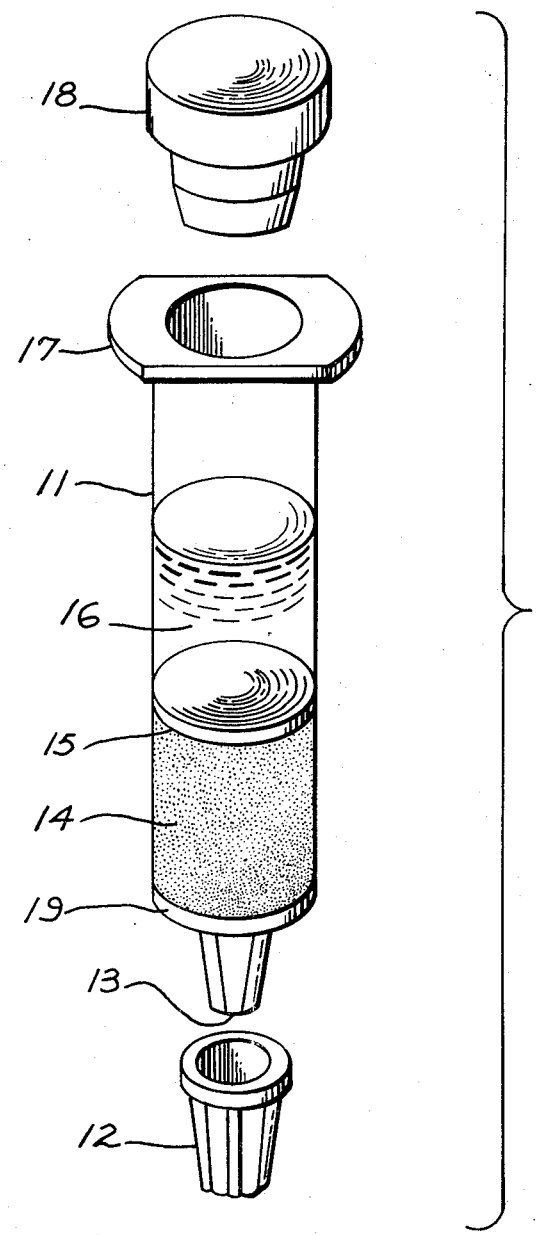
INVENTORS
AMIRAV GORDON
JACK GROSS
BY Harry J. Stephenson
ATTORNEY

VITRO TEST SYSTEM FOR ASSESSING THYROID FUNCTION

BACKGROUND OF THE INVENTION

The hormone output of the thyroid gland is transported to the peripheral tissues by the blood stream. Of this hormone output thyroxine (T–4) is the principal substance and is protein bound. The protein moiety of such a combination is usually called the thyroxine-binding globulin (TBG) and combines with thyroxine (T–4) and other thyroid hormones such as triiodothyronine (T–3) in vitro as well as in vivo. In regard to such combining power with TBG it has been found that T–4 will replace T–3 already bound to TBG but F–3 will not replace T–4 already bound to TBG.

It has been found over the years that the amount of free T–4 in the serum of an individual patient is an indication of the status of the thyroid gland and can be used to assess thyroid function and indirectly determine certain functional states represented by hypothyroidism and hyperthroidism. In using such tests of thyroid function, diseases such as exophthalmic goiter, myxedema and so forth can be detected.

DESCRIPTION OF THE PRIOR ART

Four general types of tests have been used to assess thyroid function. These are biological, chemical, radiological and radiochemical. Of the four, the in vitro radiochemical test have recently come into favor, primarily because they are rapid and can be performed in the laboratory. This is very advantageous as far as patient convenience and safety is concerned. Of the in vitro radiochemical thyroid test systems, the T–3 uptake and/or T–4 serum measurements provide optimum information. The T–3 uptake test involves an indirect measurement of the concentration of unsaturated or free TBG present in the serum. Such a test system involves the addition of radioactive tagged T–3 to a serum sample and the utilization of a secondary binding site such as an ion exchange resin to separate the bound from the unbound T–3. The T–4 test system is somewhat similar but may involve a binding of radioactive tagged T–4 and untagged T–4 to the resin, followed by a partial elution of both with a proteinaceous fluid. Such a system is often termed an isotope dilution technique. In both of the above test systems, measurement of the radioactivity of the system before and after washing or eluting from a secondary binding site gives an indication of the desired hormone content or function.

Such prior art methods, however, are inefficient, lengthy and tedious since they usually require large quantities of serum sample, an incubation period and special extraneous vessels and equipment.

OBJECTS OF THE PRESENT INVENTION

It is an object of the present invention to provide a radioactive thyroid function test system which is operable with the use of only a microquantity of serum sample, i.e., 0.15 ml. or less.

It is another object to provide such a test system which requires no incubation time.

It is still another object to provide such a test system which uses a single vessel to contain the test reagent, carry out the test reaction and determine the radioactivity of the test system.

SUMMARY OF THE INVENTION

It has now been found that the above objects may be achieved by the utilization of a microquantity of serum sample and a cross linked dextran gel column having a fixed geometry. The column is enclosed within a tubular body having valve means at the lower end thereof and having an open upper end portion through which the reagents may be introduced, either sequentially or in combination. The fluids are preferably allowed to flow by gravity through the column.

BRIEF DESCRIPTION OF THE DRAWINGS

The sole FIGURE of the drawing is an exploded perspective view of one form of the apparatus for the practice of the present invention.

DESCRIPTION OF THE PREFERRED EMBODIMENTS

The form of the invention shown in the drawing comprises essentially a cylindrical tubular body 11 having a fixed geometry and terminating at one end in a tapered tip portion 13. The body 11 is formed of polypropylene or other suitable material and is provided with valve means, such as a friction fit cap 12, which fits over and removably closes the tip portion 13. A quantity of cross linked dextran gel 14, which will be more completely described hereinafter, is retained between two porous polyethylene disc 15 and 19 in the lower portion of the body 11. A buffer or the reaction mixture 16 may be retained in the upper portion of the body 11 as shown. The upper end of the body 11 may be formed with an outwardly projecting flange 17 for ease of holding the body 11 in an upright position in a suitable rack and a removable cap 18 is provided for sealing the upper end of the body 11 and thereby preventing the column from drying out during storage or shipment.

As noted above, the basic chemical constituent of the apparatus of the present invention is the column 14 of cross linked dextran gel retained in the lower end of the body 11. Known commercially as Sephadex, this material is a cross linked polysaccharide having the ability to act as a molecular sieve, i.e., it retains molecules in various degrees depending upon their size and to some extent their charge. The use of this dextran gel technique as a molecular sieve is often called gel filtration. Sephadex G–25, a type of dextran gel which excludes materials of greater than 2000 to 3000 molecular weight from the grains, is insoluble in water and salt solutions and is very stable in alkalies and weak acids. Such a substance is preferable for use in the present invention.

The apparatus of the present invention may advantageously be prepared by initially hydrating the dry dextran gel with an appropriate buffer (as will be described hereinafter). About 450 mg. (on a dry basis) of gel 14 is placed in the lower one third of body 11 between porous polyethylene discs 15 and 19. The body 11 illustrated has an inside diameter of about 13 mm. and a total length of about 7.6 cm., and the discs 15 and 19 have a diameter of 13 mm. The gel 14 occupies a volume of about 2.5 ml. While the above materials and sizes are merely exemplary, it has been found that such a geometry ideally fits the counting well of certain commercial radiation counting instruments, such as the Gammacord gamma counter.

As far as the method of the present invention is concerned it has been found that the previously described apparatus, coupled with the utilization of a microquantity of serum sample, results in a thyroid function test device and method which has several unexpected and important advantages. By microquantity of serum sample, it is meant a sample size which may range from about 0.01 ml. to about 0.15 ml. and which preferably is within the range of 0.05 to 0.10 ml. By using a microsize serum sample in combination with an amount of radioactive tagged thyroid hormone appropriate for the test system being utilized, a test is effected which has all the advantages previously mentioned, i.e., no incubation time, a single reaction device and counting vessel, universal application and so forth.

Basically, regardless of whether a T-3 or T-4 test is being performed, the method consists of the following steps:

A. Combining a microquantity of the serum to be tested with an appropriate amount of radioactive tagged thyroid hormone in the upper portion of the body 11 as previously described;

B. Immediately allowing the combination to displace the fluid in the gel column 14 by opening the valve means (removing the cap 12);

C. determining the total added thyroid hormone by use use of a radioactive measuring means, D. eluting the gel column 14 with an aqueous fluid;

E. determining the amount of hormone retained in said column by the use of a radioactive measuring means; and, F. making a suitable calculation appropriate to the hormone or hormone function being studied or assessed.

EXAMPLES

1. T-3 (TBG Saturation) Test

This test system is based on the fact that TBG will in vitro bind radioactive tagged T-3 (triiodothyronine) which indirectly measures free thyroid hormone in the blood.

Apparatus for practicing the invention were prepared by hydrating Sephadex G-25 (fine) in 0.075 M citric-phosphate buffer containing 0.1 percent formaldehyde at a pH of 5.0 and placing an amount equal to 450 mg. (on a dry basis) in a body 11 as previously described. With the cap 12 in place, about 3 ml. of buffer was placed in the body 11 over the gel column 14 to retain it in a moist condition. The upper end of the body 11 was then closed with the friction fit cap 18.

A blood sample was taken from an individual to be tested and serum was separated therefrom using standard techniques. The body 11 was uncapped, the buffer discarded and 7 drops of $^{124}$I-T3 solution having a concentration of 10 ng. (nanogram)/ml and an activity of about but less than 0.1 microcurie was introduced into the body 11 above the disc 15. Using a micropipette, 0.05 ml. of serum was then added directly to the T-3 solution in the body 11, and said body gently swirled to mix the ingredients. The body 11 was then placed in a suitable rack over a container (such as a disposable test tube) and the cap 12 removed to permit the mixed T-3 solution and serum sample to enter the gel column by gravity flow. After about 2-3 minutes when the draining stopped, the lower cap 12 was replaced and the body 11 was placed in a counting well of a Gammacord gamma radiation counting instrument.

The radioactivity in the gel column 14 was counted for one minute, and it was found that the gamma activity was 40,000 counts per minute. The body 11 was then replaced in the rack and the lower cap 12 removed. Three ml. of distilled water were introduced into the top of the body 11 and allowed to drain through the gel column 14. After about 10-15 minutes draining time the lower cap 12 was replaced and the radioactivity in the gel column 14 again counted. The second count was 20,000 counts per minute. The percent retention was calculated to be 50 percent based on the second count divided by the first count × 100. Such a percent retention is indicative of an euthyroid or normal state. Sera from hypothyroid patients give significantly lower percent retention, and sera from hyperthyroid patients give significantly higher percent retention.

2. T-4 (Total Thyroxine Test)

Apparatus for practicing the invention was prepared as in Example 1 for the T-3 test; however, 10 ml. of N HCl was added to the body 11 to convert the contents to an acid pH condition. Blood was taken from an individual and the serum separated therefrom using standard techniques. The serum was diluted 1-2 with 0.076 M citrate-phosphate buffer having a pH of 2.4.

Five drops of $^{125}$T-4 solution having a concentration of about 10 ng. (nanograms)/ml. and an activity of about but less than 0.1 microcurie were introduced into the body 11 followed by 0.1 ml. of the diluted serum (effective amount of serum = 0.033 ml.). The mixture was gently swirled, the bottom cap 12 removed and the mixture allowed to gravity flow into the gel column 14 which was then washed with 4 ml. of 0.075 M citrate - phosphate buffer having a pH of 5.0. The cap 12 was replaced and the gamma activity in the gel column 14 determined for one minute in a Gammacord counter. This resulted in a count of 100,000 counts/minute.

The column 14 was eluted with 0.8 ml. of an eluting reagent comprising 0.2 percent human α-globulin in 0.075 M barbital buffer having a pH of 8.6. After elution, the gel column 14 was washed with 6 ml. of 0.076 M citrate-phosphate buffer. The gamma radioactivity remaining in the column 12 was then determined using the Gammacord counter and found to be 50,000 counts/minute. Percent retention was calculated by dividing the second count by the first and multiplying by 100. This percentage, from a standard curve prepared from known samples, was found to be equivalent to 6 nanograms of T-4.

The rationale of the above T-4 test is that the radioactive thyroxine ($^{125}$I T-4) is retained on the secondary binding site (dextran gel) along with the thyroxine in the serum sample. The first count is then made followed by a partial proportional removal of $^{125}$I T-4 and T-4 from the serum. A second count is then made and a ratio of the two counts gives an indication of the T-4 content of the serum sample. This is called an isotope dilution technique. In the present example the thyroxine concentration was indicative of a euthyroid or normal condition in the individual being tested. Significantly less than or more than 6 nonograms is indicative of abnormal thyroid conditions.

It will be appreciated that the radioactive tagged thyroid hormones can be prepared using standard techniques. Preferably $^{125}$I (iodine 125) is used as an isotope tagging substance because of its half life of 60 days, although $^{131}$I (iodine 131) can also be employed.

It will also be appreciated that the parameters of the present test can be somewhat changed; however, by utilizing the disclosed body geometry, gel column volume microquantity samples of reactants and proportions of reactants, a unique, and universal device and method is provided which has unexpected advantages.

The following proportions of ingredients or quantities may be utilized:

| | |
|---|---|
| Serum sample | 0.01 to 0.15 ml. |
| Dextran gel | 300 to 600 mg. |
| Radioactive thyroid hormone solution (not critical) | sufficient to give a statistically accurate count. |

It is the usual practice of the present invention to employ a ratio of serum sample to dextran gel in a range of about from 1:2000 to 1:60,000 (ml.:mg.). A preferable range is 1:4500 to 1:9000.

What is claimed is:

1. An improved in vitro method for assessing thyroid function, comprising:
   A. adding a predetermined quantity of a radioactive isotope tagged thyroid hormone solution having a determined radioactivity and a predetermined microquantity of blood serum to a column of fixed geometry consisting of a predetermined quantity of cross linked dextran gel in an aqueous fluid;
   B. immediately allowing said mixture to displace a portion of said fluid in said column;
   C. eluting said column with a predetermined amount of an aqueous fluid.
   D. determining the amount of hormone retained in said column by measurement of radioactivity;
   E. making a calculation based on the ratio of the amount of retained hormone to the total amount of hormone added.

2. Method as in claim 1 wherein the thyroid hormone is selected from the group consisting of thyroxine and triiodothyronine.

3. Method as in claim 1 wherein the quantity of serum used is about from 0.01 ml. to 0.15 ml.

4. Method as in claim 1 wherein the ratio of serum sample in ml. to dextran gel in mg. on a dry basis is in the range of about 1:2000 to 1:60,000.

5. Method as in claim 4 wherein the ratio range is about from 1:4500 to 1:9000.

6. Method as in claim 1 wherein the radioactivity measurements are made using a gamma counter.

7. Method as in claim 1 wherein the radioactive isotope is iodine 125.

8. Method as in claim 1 wherein the radioactivity measurements are made by counting the column.

* * * * *